US009721292B2

(12) United States Patent
Agarwal et al.

(10) Patent No.: US 9,721,292 B2
(45) Date of Patent: Aug. 1, 2017

(54) SYSTEM AND METHOD FOR IMAGE QUALITY SCORING

(71) Applicant: eBay Inc., San Jose, CA (US)

(72) Inventors: Vinayak Agarwal, Santa Clara, CA (US); Atiq Islam, San Jose, CA (US); Zhaohui Chen, Saratoga, CA (US)

(73) Assignee: eBay Inc., San Jose, CA (US)

( * ) Notice: Subject to any disclaimer, the term of this patent is extended or adjusted under 35 U.S.C. 154(b) by 328 days.

(21) Appl. No.: 13/724,650

(22) Filed: Dec. 21, 2012

(65) Prior Publication Data

US 2014/0180758 A1 Jun. 26, 2014

(51) Int. Cl.
G06Q 10/00 (2012.01)
G06Q 30/08 (2012.01)
G06Q 10/06 (2012.01)
G06Q 30/06 (2012.01)

(52) U.S. Cl.
CPC ....... G06Q 30/08 (2013.01); G06Q 10/06393 (2013.01); G06Q 30/06 (2013.01)

(58) Field of Classification Search
CPC .............................. G06Q 10/00; G06Q 30/02
USPC .............................................. 705/7.11–7.42
See application file for complete search history.

(56) References Cited

U.S. PATENT DOCUMENTS

| 6,275,600 | B1 | 8/2001 | Banker et al. |
| 6,324,545 | B1* | 11/2001 | Morag .......................... 707/737 |
| 6,711,287 | B1 | 3/2004 | Iwasaki |
| 6,915,024 | B1 | 7/2005 | Maurer |
| 7,856,380 | B1* | 12/2010 | Latin-Stoermer et al. .. 705/27.1 |
| 7,912,279 | B2 | 3/2011 | Hsu et al. |
| 8,538,943 | B1 | 9/2013 | Bau et al. |
| 8,605,105 | B2 | 12/2013 | Hong et al. |
| 8,675,957 | B2 | 3/2014 | Goswami et al. |
| 8,712,862 | B2* | 4/2014 | Gokturk ........... G06F 17/30256 705/26.1 |
| 8,736,867 | B1* | 5/2014 | Amidon et al. ............. 358/1.15 |
| 9,026,526 | B1 | 5/2015 | Bau et al. |
| 9,189,554 | B1 | 11/2015 | Bau et al. |
| 9,411,827 | B1 | 8/2016 | Bau et al. |
| 2004/0068449 | A1 | 4/2004 | Suzuki et al. |
| 2006/0098875 | A1 | 5/2006 | Sugimoto |
| 2006/0256388 | A1 | 11/2006 | Erol et al. |
| 2007/0022003 | A1* | 1/2007 | Chao et al. ..................... 705/14 |

(Continued)

OTHER PUBLICATIONS

"U.S. Appl. No. 13/300,305, Examiner Interview Summary mailed Oct. 23, 2013", 3 pgs.

(Continued)

Primary Examiner — David Rines
(74) Attorney, Agent, or Firm — Schwegman, Lundberg & Woessner, P.A.

(57) ABSTRACT

A system receives images of objects. The system identifies a category for each of the objects, and extracts features from the images. The features relate to a quality of the image. The features of the images are stored in a database according to the category of each object, such that each set of features is associated with its corresponding image. The system displays the images on a network-based publication system, and receives data relating to the displayed images. The data is analyzed, and the images are ranked as a function of the analysis. The system redisplays the images on the network-based publication system as a function of the ranking of the images.

15 Claims, 6 Drawing Sheets

(56) References Cited

U.S. PATENT DOCUMENTS

| | | |
|---|---|---|
| 2007/0248244 A1 | 10/2007 | Sato et al. |
| 2007/0253631 A1 | 11/2007 | Mccandlish et al. |
| 2008/0068384 A1 | 3/2008 | Achong et al. |
| 2008/0101690 A1 | 5/2008 | Hsu et al. |
| 2009/0070346 A1 | 3/2009 | Savona et al. |
| 2009/0116747 A1 | 5/2009 | Duong et al. |
| 2009/0147988 A1 | 6/2009 | Jones et al. |
| 2009/0245633 A1* | 10/2009 | Bilcu et al. ............ 382/167 |
| 2009/0254455 A1* | 10/2009 | Rothey et al. ............ 705/27 |
| 2009/0278658 A1 | 11/2009 | Higashiyama |
| 2009/0297038 A1 | 12/2009 | Ishikawa et al. |
| 2009/0316962 A1 | 12/2009 | Sun et al. |
| 2010/0266214 A1 | 10/2010 | Jobson et al. |
| 2011/0109620 A1 | 5/2011 | Hong et al. |
| 2012/0128239 A1 | 5/2012 | Goswami et al. |
| 2012/0268612 A1 | 10/2012 | Wang et al. |
| 2013/0142418 A1* | 6/2013 | van Zwol et al. ............ 382/159 |
| 2014/0164146 A1 | 6/2014 | Goswami et al. |

OTHER PUBLICATIONS

"U.S. Appl. No. 13/300,305, Non Final Office Action mailed Jul. 10, 2013", 10 pgs.

"U.S. Appl. No. 13/300,305, Notice of Allowance mailed Oct. 30, 2013", 13 pgs.

"U.S. Appl. No. 13/300,305, Response filed Jun. 18, 2013 to Restriction Requirement mailed May 24, 2013", 14 pgs.

"U.S. Appl. No. 13/300,305, Response filed Oct. 10, 2013 to Non Final Office Action mailed Jul. 10, 2013", 17 pgs.

"U.S. Appl. No. 13/300,305, Restriction Requirement mailed May 24, 2013", 7 pgs.

"U.S. Appl. No. 13/300,305, Supplemental Amendment filed Oct. 17, 2013", 16 pgs.

"U.S. Appl. No. 14/180,255, Non Final Office Action mailed Apr. 23, 2015", 25 pgs.

"U.S. Appl. No. 14/180,255, Notice of Allowance mailed Sep. 23, 2015", 12 pgs.

"U.S. Appl. No. 14/180,255, Preliminary Amendment filed Feb. 27, 2014", 8 pgs.

"U.S. Appl. No. 14/180,255, Response filed Jul. 23, 2015 to Non Final Office Action mailed Apr. 23, 2015", 22 pgs.

"U.S. Appl. No. 14/180,255, Supplemental Response filed Sep. 3, 2015 to Office Action mailed Jul. 23, 2015", 8 pgs.

"U.S. Appl. No. 15/015,281 , Preliminary Amendment filed Feb. 19, 2016", 10 pgs.

"U.S. Appl. No. 15/015,281, Non Final Office Action mailed Mar. 29, 2017", 14 pgs.

"U.S. Appl. No. 15/015,281, Examiner Interview Summary mailed May 23, 2017", 6 pgs.

* cited by examiner

SYSTEM AND METHOD FOR IMAGE QUALITY SCORING

TECHNICAL FIELD

The present disclosure generally relates to image quality scoring, and in an embodiment, but not by way of limitation, a system and method for image quality scoring on a network-based publication system.

BACKGROUND

The use in commerce of network-based systems such as the Internet has grown exponentially over the last decade or so. Such network-based based systems can be an Internet-based auction site, a commerce site that seeks the best price for consumers (e.g., travelocity.com), or the web site of a particular merchant. In situations where a good is offered for sale on a commerce site, an image of that good is sometimes displayed on the web site. In the case of network-based auctions, such images originate from the thousands of sellers who use the network-based auction site. In a network-based auction site, a buyer searching for a good will have displayed to him or her search results that include images of goods that are up for sale or bid on the auction site.

BRIEF DESCRIPTION OF THE DRAWINGS

Some embodiments are illustrated by way of example and not limitation in the figures of the accompanying drawings in which.

DETAILED DESCRIPTION

Example systems and methods for providing an evaluation, ranking, and/or scoring of images for display on a network-based publication system are disclosed. In the following description, for purposes of explanation, numerous specific details are set forth in order to provide a thorough understanding of the example embodiments. It will be evident, however, to one skilled in the art that the present invention may be practiced without these specific details. It will also be evident that the evaluation, ranking, and/or scoring of images are not limited to the examples provided herein, and may include other scenarios not specifically discussed.

Figure 3:
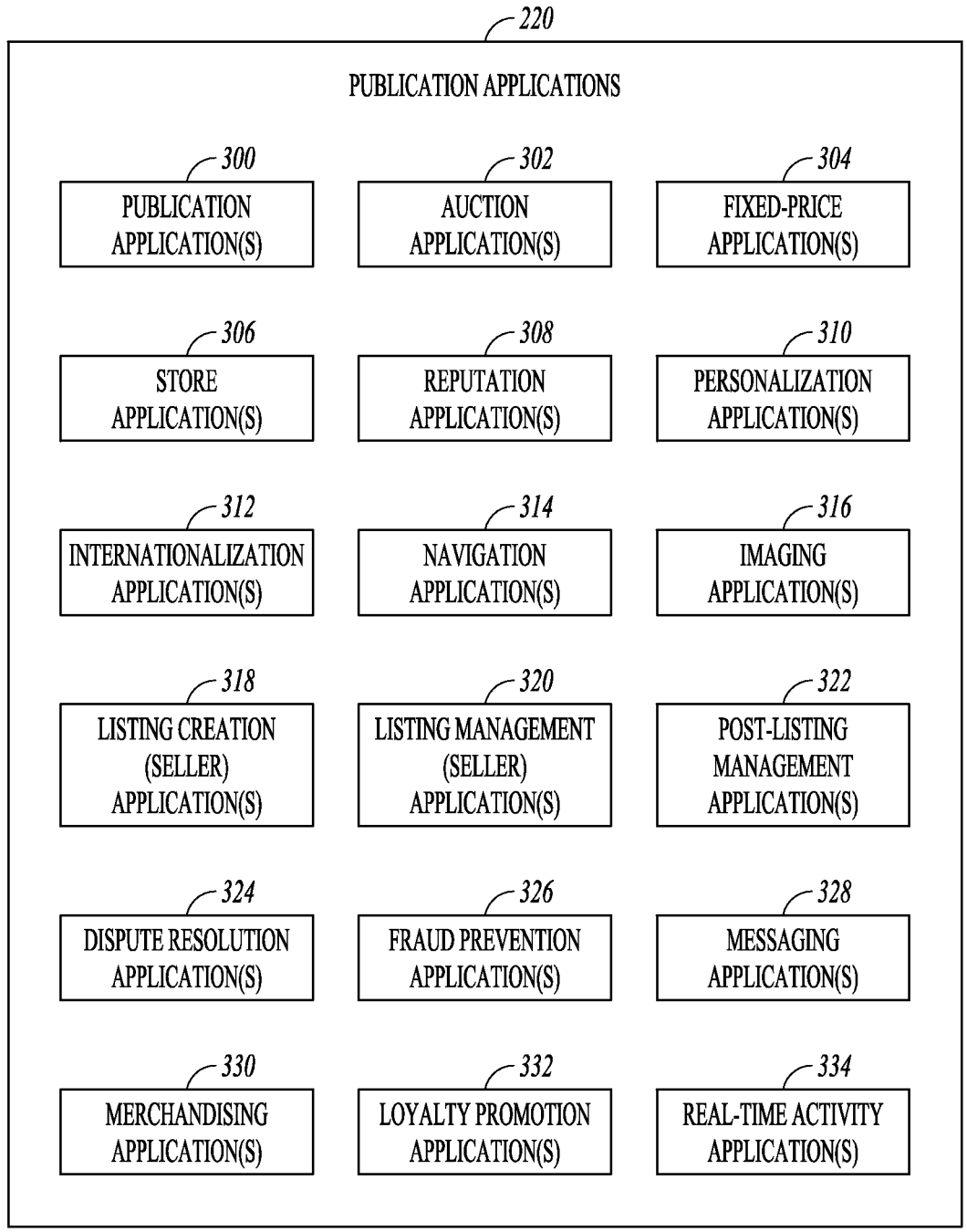
FIG. 3 is a block diagram illustrating multiple applications that, in an example embodiment, are provided as part of a networked system.

In a system and method for evaluating, ranking, and/or scoring images that are displayed on a network-based publication system, the system is trained to correlate one or more features of images (such as the size of the object pictured in the image) with data collected in connection with the display of that image (such as the number of clicks on the image). This can be referred to as the learning phase. This scoring can then be used to determine where to display a particular image in a search results page. This can be referred to as the execution phase. In an embodiment, images that are scored higher are displayed higher on the search results page, thereby increasing the chances that that item will sell and/or will sell more quickly, which will increase the revenue of the network-based publication system. One or more of the learning phase and the execution phase can be part of an imaging application 316 of a publication application 220 as illustrated in FIG. 3.

Figure 1A:
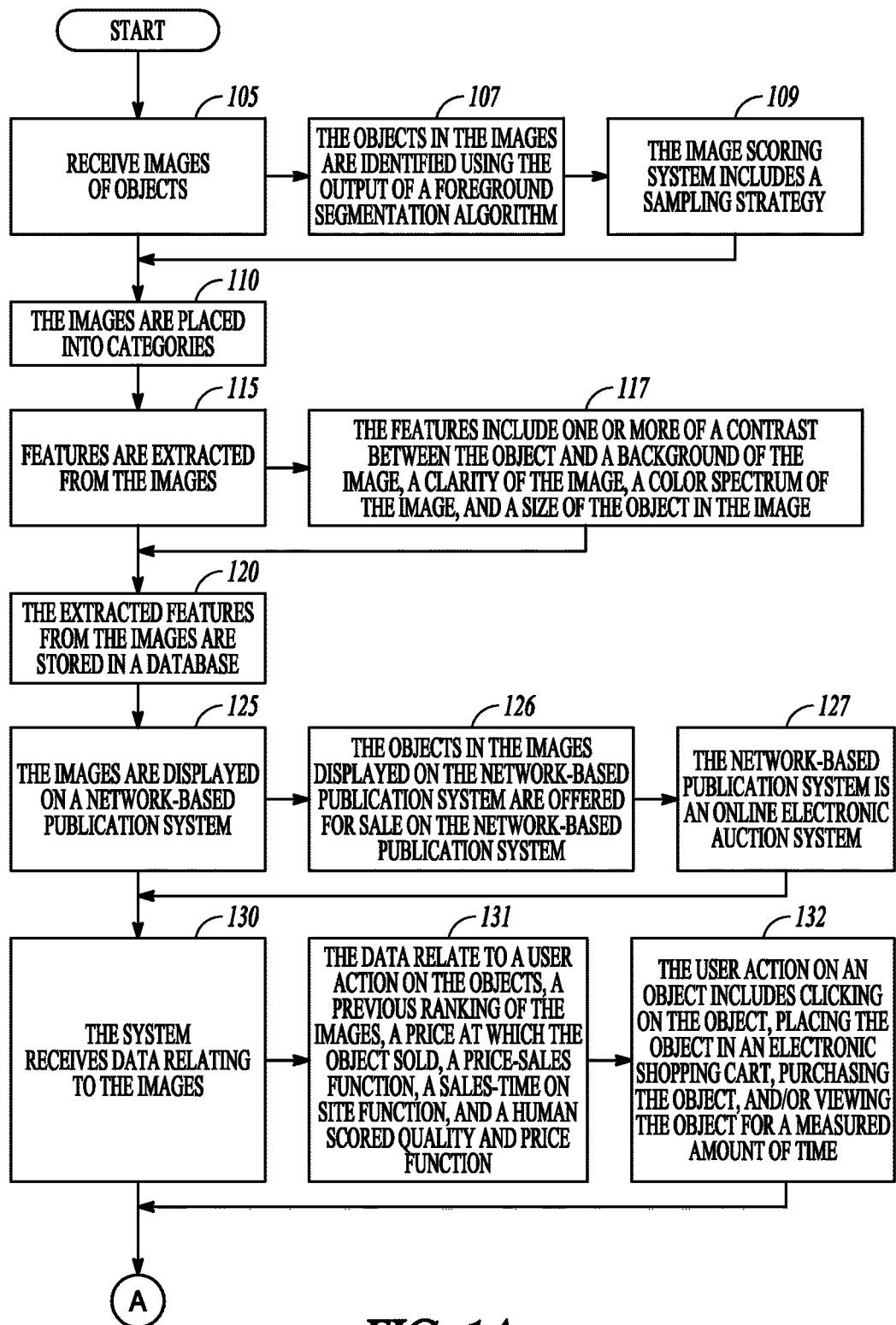
FIGS. 1A and 1B are a flow chart of an example embodiment of a process to evaluate, rank, and/or score images for display on a network-based publication system.
Figure 1B:
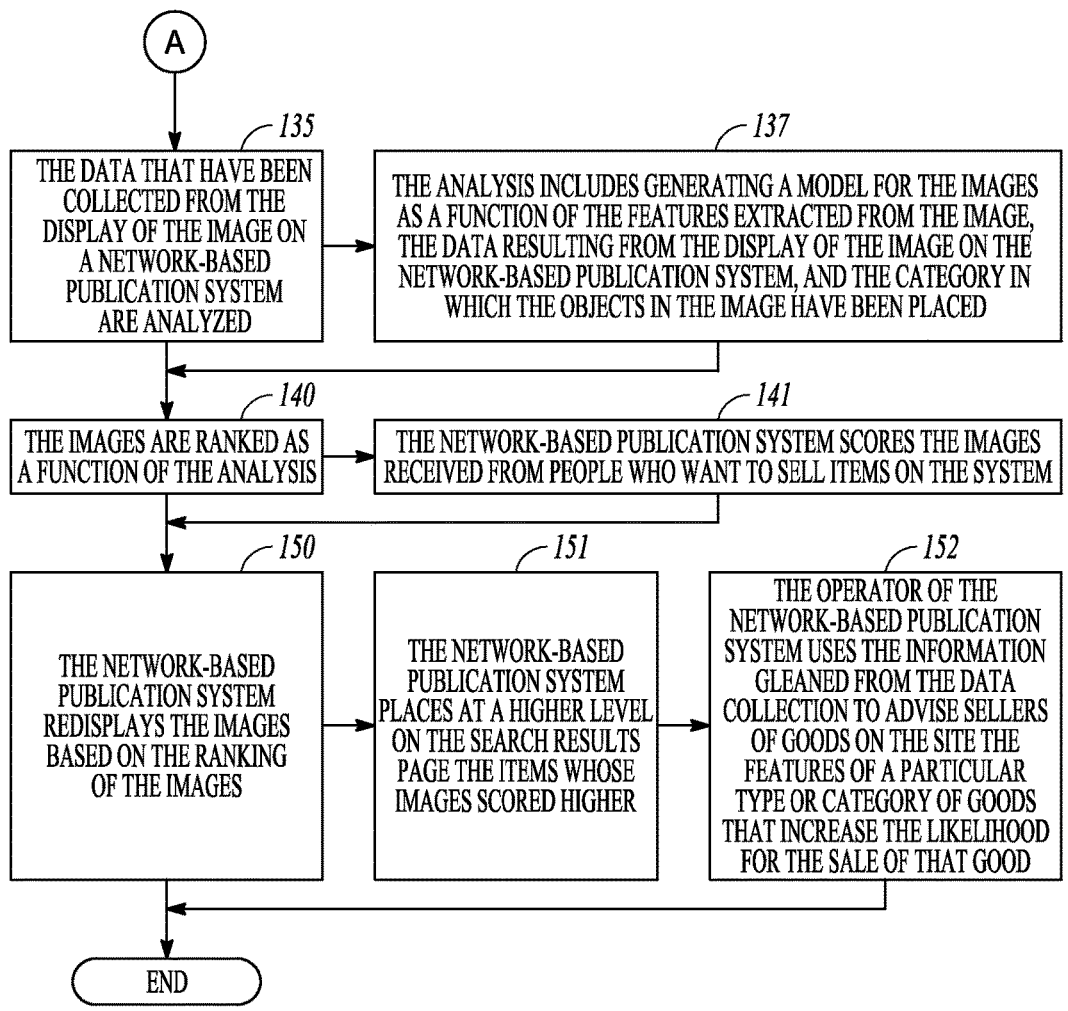

FIG. 1 is a flowchart-like block diagram of an example process 100 for evaluating, ranking, and/or scoring images for display on a network-based publication system. FIG. 1 includes a number of process and feature blocks 105-152. Though arranged substantially serially in the example of FIG. 1, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

As noted above, an embodiment of a system for scoring images in connection with displaying the images on a network-based publication system includes a learning phase and an execution phase. In general, the learning phase is illustrated in steps 105-137 of FIG. 1, and the execution phase is illustrated in steps 140-152 of FIG. 1. Referring specifically to FIG. 1, at 105, a computer processor receives images of objects. As indicated at 107, the objects in the images can be identified using the output of a foreground segmentation algorithm. The objects in the images can be items that will be displayed on a network-based publication system. The objects or items can be newly-received objects from potential sellers, images previously displayed on the network-based publication system, and/or images specifically created for display during the learning phase. For example, if an operator of a network-based publication system suspects that a particular object or item will generate more interest when displayed on the network-based publication system with certain features, such as against a particular background, then the system can verify or refute that suspicion. Similarly, if it is common or accepted knowledge that another object or item will generate more interest when displayed with certain features, that common or accepted knowledge can actually be put to the test in this system.

Block 109 illustrates that an embodiment of the image scoring system can include a sampling strategy, that is, a strategy in choosing the images to consider in connection with learning a model that governs the selection of images to display on the network-based publication system. For example, the sampling strategy can be based on one or more categories. Specifically, an operator of the network-based publication system may be interested in scoring images in a particular broad category, such as lawn and garden equipment, or a somewhat narrower category, such as wheelbarrows. The sampling strategy would be designed accordingly. As another example, the sampling strategy could be based on a sales-impression value. The sales-impression value relates to the amount of sales that a particular type of item has received, normalized by the number of times that item was shown on the network-based publication system. As another example, the sampling strategy could be based on clicks-impression value. The clicks-impression value relates to the level of interest (as evidenced for example by the number of times that users of the system click on an image) that a particular type of item has received on the network-based publication system. If a particular type of item enjoys a high level of interest, an improvement in the image quality could increase that interest (and sales) even more. As another example, the sampling strategy can be based on a human-generated image quality score. In such a strategy, the operator of the network-based publication system selects images that have been scored high by a human, displays the images on the network-based publication system, and then collects data (amount of sales, number of clicks, etc.) to determine if the human scoring is accurate or if the scoring should be changed on the item. As noted below, there may be some instances in which human scoring is one of the better ways to score an image (such as when a piece of clothing is worn by a person in an image).

The sampling strategy can relate to subsets/samples of images (usually of high quality) shown to the end user (as just described in the previous paragraph). In another embodiment, the term 'sampling strategy' refers to a process of collecting the data, based on human-judged image quality, sales-impressions, or some other factor. The data is used to learn the model to predict the target such as sales-time on site or clicks-time on site etc.

At 110, the images are placed into categories. This categorization of the images is normally accomplished with the assistance of some human input. For example, if the image originates from a person who would like to sell or otherwise display the item on the network-based publication system, the seller can be asked to provide or select a category into which the item should be placed. For example, if the seller is looking to display pictures of dishes on the network-based publication system, the seller may categorize the dishes into the categories of household items, kitchen ware, and/or dishes, depending upon the marketing strategy and other considerations of the seller. Such categorization could also be performed by a third party, such as the operator of the network-based publication system.

At 115, features are extracted from the images. The features relate to a quality of the image. More specifically, as illustrated at 117, the features can include one or more of a contrast between the object and a background of the image, brightness of the image, color spectrum of the image, and size of the object in the image. The extraction of features could be performed by a processor, for example by using computer vision analysis techniques, or by a human who simply examines the image. Using computer vision techniques, the system could use foreground segmentation to determine the foreground-background line of demarcation. This foreground-background line of demarcation could then be used to determine the contrast between the object and the background of the image. Pixel brightness could also be used to examine the foreground-background separation characteristics, and of course as a factor itself since the brightness of an image may have an influence on how people respond to that image. The resulting sub-image from the foreground separation can also be used to gauge the size of the object within the field of view or image size of the image, as the size of the object in the image may have an effect on the reaction to the image by users of the network-based publication system. The color of the object can also be considered as a feature or factor in the analysis, as certain objects of certain color may result in an increased interest in the object or item. As noted, the features from an image can also be "extracted" by a human, as a human can more than likely determine the brightness of an image, the color of objects in the image, and the relative size of an object in an image. Persons of skill in the art will realize that other features or factors could also be considered.

At 120, the extracted features from the images are stored in a database. The images can be stored in the database according to the category or categories with which the image is associated. In this manner, all of the features of an image are readily accessible for retrieval by the system in either the learning phase or the execution phase.

At 125, the images are displayed on a network-based publication system, and at 130, the system receives data relating to the images. The collected data can relate to different events on the system. For example, as indicated at 131, the data can include or relate to a user action on the objects, a previous ranking of the images, a price at which the object sold, a price-sales function, a sales-time on site function, and a human scored quality and price function.

As noted above, and as further noted at 126, the objects displayed on the network-based publication system can be offered for sale on the network-based publication system. Alternatively, the items can simply be displayed on a network-based publication system for electronically displayed on a non-networked system) in a test environment to determine how people react to different images. As further noted at 127, the network-based publication system can be an online electronic auction system.

As indicated at 132, the user action on an object can include clicking on the object, placing the object in an electronic shopping cart, purchasing the object, and/or viewing the object for an extended amount of time. These user actions indicate one or both of a specific and/or overall/general quality of an image, and as will be explained in more detail herein, this data can be used as a factor, in combination with other factors (such as the loyalty of the seller to the auction site), in a determination of where to place a particular image on a search results page. Additionally, if a certain feature, features, or combination of features are very often part of an image that is subject to a user action, that feature, features, or combination of features is a positive quality of the object image that should be part of any image of that type of object in that category. Specifically, if the training/learning phase shows that users tend to click on objects with a certain feature more than other features (for example, placing a diamond on a royal blue or burgundy background rather than a white background), then images with those features should be placed higher on the search results page. Buyers will be more apt to make a purchase if higher quality images are at their immediate disposal, rather than down two or three pages of the search results. Similarly, the same data implications and logic apply to items that are placed in an electronic shopping cart, objects that are purchased, and objects that are viewed for a relatively longer time than other objects (that don't have the same features as the object that is viewed for the longer time).

Regarding the previous ranking of the images, this can be helpful in determining whether previous methods of evaluating images can identify favorable features of object images or not. If such previous methods can identify favorable features, those methods can be continued to be used. If such methods cannot make such identifications, then such methods should not be used. The previous methods include both previous methods, and a continuing evaluation of currently used methods. For example, if a network-based publication facility historically has evaluated image quality via a human input method, then the ability of humans to identify and score image quality can be objectively determined using an embodiment of the present disclosure. Similarly, if a system has been trained, and has determined using computer analysis techniques that a particular pixel brightness along an edge of a foreground-background demarcation is a feature that results in increased interest in an item, that previous and established ranking can be monitored to determine its continued effectiveness. Additionally, an entirely new brightness feature may be tried, and the new brightness feature may turn out to be more effective than the previous brightness feature.

Similarly, a price at which the object sold, a price-sales function, a sales-time on site function, and a human scored quality and price function can be part of the data collected during the learning phase to determine the image quality score of an image and further determine the consequent features of an image that result in an increased interest in the item. Specifically, it may be determined that items that sold for higher prices normally were displayed on the network-based publication system with a higher quality image. For example, the data may show that clothing sells at a higher price when worn by a person rather than simply displayed against a background. Moreover, the collected data may show that the clothing sold at an even higher price when worn by a relatively thin person versus a more portly person, or at yet an even higher price when worn by a person of exceptional looks rather than a person of merely average looks. It is noteworthy that the size of a person may be determinable by computer vision/analysis techniques, but the relatively beauty of a person may have to be determined by human evaluation, thereby illustrating that in some embodiments, human input can work hand in hand with the technological aspects of the system to score and identify images that will result in a higher level of interest on the network-based publication system.

The data collected in the learning or training phase (also referred to as the target data) relating to prices and sales can be used as a simple absolute amount in the analysis, that is, the price at which an item sold. Alternatively, a more detailed price-sales function can be used to train the system. A first formulation or function that can be used to train the system can be referred to as a sales-impression function. The sales-impression function (also can be referred to as the log of smoothed sales-impression) can be expressed as follows:

SOI=im001/(im009+1)
smoothedSOI=(im001+mean(SOI)*smoothParam)/(im009+smoothParam)
target=log(smoothedSOI)

A views-impression function (also can be referred to as the log of smoothed views-impression) can be expressed as follows:

VOI=im005/(im009+1)
smoothedVOI=(im005+mean(VOI)*smoothParam)/(im009+smoothParam)
target=log(smoothedVOI)

A price-SOI function (also can be referred to as the log of price multiplied by the smoothedSOI) can be expresses as follows:

SOI=im001/(im009+1)
smoothedSOI=(im001+mean(SOI)*smoothParam)/(im009+smoothParam)
target=log((Item_NBinTotalCost+1)*smoothedSOI)

A delta-VOI function (also can be referred to as filtered views over impressions) can be expressed as follows:

VOI=(ViewFilteredByTime+1)/(ValidImp+1)
smoothedVOI=(ViewFilteredByTime+mean(VOI)*50)/(ValidImp+50)
target=log(smoothedVOI)

A price-SOS function (can also be referred to as the log of price multiplied by the smoothed sales and time on site) can be expressed as follows:

SOS=im021/(0.0001+Item_TimeOnSite/3600)
smoothedSOS=(im021+smoothParam*mean(SOS)/(Item_TimeOnSite/3600+smoothParam)
target=log((Item_NBinTotalCost+1)*smoothedSOS)

An SOS function (can also be referred to as time on site before sale) can be expressed as follows:

SOS=im021/(0.0001+Item_TimeOnSite/3600)
smoothedSOS=(im021+smoothParam*mean(SOS))/(Item_TimeOnSite/3600+smoothParam)
target=log(smoothedSOS)

An image quality and price-SOI function can be expresses as follows:

SOI=im001/(im009+1)
smoothedSOI=(im001+mean(SOI)*smoothParam)/(im009+smoothParam)
target=ImgQualQualityScoreV1*log((Item_NBinTotalCost+1)*smoothedSOI)

An image quality and price-SOS function can be expressed as follows:

SOS=im021/(0.0001+Item_TimeOnSite/3600)
smoothedSOS=(im021+smoothParam*mean(SOS))/(Item_TimeOnSite/3600+smoothParam)
target=ImgQualQualityScoreV1*log(Item_NBinTotalCost+1)*smoothedSOS The following definitions apply to the above formulas. The im001 value of a particular item refers to the total number of sale events attributed to that item so far and decayed by a half life of 7 days. The im005 value of a particular item refers to total number of click events attributed to that item so far and decayed by a half life of 7 days. The im009 value of a particular item refers to total number of impressions attributed to that item and decayed by a half life of 7 days. Since im001, im005 and im009 are historical values, the decay is useful in ensuring that events/trends in the recent past are given more importance that those that occurred at an earlier point in time. The term im017 is similar to the term im005 in that it represents the total number of click events attributed to a particular item, except that its value is not decayed over time. The term im021 is similar to the term im009 in that it represents the total number of impressions attributed to a particular item, except that its value is not decayed over time.

The term smoothParam is a constant, and in an embodiment, the value of smoothParam is equal to 500. SmoothParam refers to a smoothing parameter, the significance of which is as follows. For a typical network-based publication system, for example an online auction, there are some items for which the operator of the system is rather confident about the quality based on the historical sales, clicks, impressions values, etc. However, fix other items, there may not be much information and hence the operator is not sure about those items. Most of the time, such a network operator is uncertain about newly listed items because there is not enough historical information on the newly listed items. Specifically, there is no information that indicates whether the item is good quality or bad quality, and most of its values such as impressions, clicks, and sales are insignificant when compared to other items (that are not newly listed). Therefore, to avoid an unfair judgment of these newly listed items, an operator embraces the following. For example, whenever the value of impressions the number of times the item was shown on the website) to the user is low, such a low value will not be considered to be a major driving force, and the system will treat the behavior of such items as the average behavior of all the items in the system.

As a further example, a smoothing parameter value of 500 for a target SOI (sales over impressions) roughly indicates that whenever the number of impressions of an item is less than 500, the system will not be sure of its sale value, and the system would assume its estimate sales value to be the average number of sales of all the items at the network-based publication system. The value of 500 is an empirically derived value of the smoothing parameter in most cases gives optimum results.

The term Item_NBinTotalCost refers to the total cost of the item, including the shipping cost as specified by the seller of that item. The term ViewFilteredByTime refers to the total number of times the item was clicked during the sampling period. Clicks that result in a very short dwell time of the users on the View Item Page may be discarded. The term ValidImp refers to the number of times the item was shown during the sampling period. These metrics differ from the im001, im005 and im009 values in that they do not store historical item information, but only the information as gathered during the sampling period to learn the image quality model. The term Item_TimeOnSite refers to the time that the item has been available for sale on the site. If the item has been on the site for a long time (without being sold), that may indicate that the quality of the item's image may be low. The term ImgQualQualityScoreV1 refers to a score that was determined by a prior method, such as a human evaluation of an image of an object. The ImgQualQualityScoreV1 and the image score calculated by the system (via one or more of the above-listed formulas) can be compared to determine the effectiveness of the prior method (or for some other purpose).

Similarly, a sales-time on site function and a human-scored quality and price function could also be used. The time on site normalization of the sales of an item can be important because one cannot compare the number of sales event of an item that has been on the network based publication system for 2 days with the number of sales event of an item that has been on the network based publication system for 1 year. More specifically, newly listed items from the seller might potentially be sold fewer times than items that have been on the network-based publication system for a long time. Hence time on site normalization allows one to compare the sales events of items listed across different points in time. As noted, the data may show that images with a particular feature or combination of features sell more quickly than images of objects in the same category that do not have these features. In such situations, as indicated at 150, 151, the operator of the network-based publication system would want to move and/or redisplay the image of the object with a higher ranking on the search results page above images with a lower ranking (i.e. move such images to the top of the search results page), thereby increasing the chance of sales and increasing revenue for the operator of the network-based publication system. Regarding the human scored quality and price function, there may still be some features that are simply more amendable to human evaluation than computer evaluation, such as, as indicated above, determining the attractiveness of a person modeling a piece of clothing that is displayed on the network-based publication system.

In an alternative embodiment, the images are not displayed on a network-based publication system, but rather simply displayed on a display device that is not even connected to a network. For example, a test group of persons are provided with "money" to "shop" for items on the "system," and then the data can be collected from this test group. This technique may be somewhat artificial, but it allows more control over the learning phase and a more surgical examination of the features that may have more influence than other features.

At 135, the data that have been collected from the display of the image on a network-based publication system (or an electronic test display as indicated above) are analyzed. In an embodiment, as indicated at 137, the analysis includes generating models for the images as a function of the features extracted from the images, the data resulting from the display of the image on the network-based publication system, and the category in which the item in the image has been placed. Specifically, each item's image is represented as a multi-dimensional vector of its brightness, contrast, size of the object in the image etc. In addition to these item's image specific features, additional category specific image features are added to that item's feature vector. These category specific image features are the median brightness, median contrast, and median size of the object in the image of all the images in the network-based publication system that belong to that specific category. After creating the feature vector for all the items in the sampled dataset, it can be learned, using machine learning techniques, the relative weighting of the values in the feature vector that best model the value that is being targeted, such as sale-time on site, click-time on site, impressions-time on site etc. The target value as mentioned above is carefully chosen to be the one that is most closely related to the quality of images. These weights of the features learned at the learning stage can be used to predict the quality of a given item's image during the execution stage.

At 140, the images are ranked as a function of the analysis. For example, by examining which images sold more quickly on a network-based publication system, and which features such images had, the network-based publication system can rank those images and the features included in such images. At 150, the network-based publication system redisplays the images based on the ranking of the images.

An operator of an online auction or other network-based publication system can use an embodiment of the image scoring system in several manners. As indicated at 150, the operator can cause the network-based publication system to redisplay the images on the network-based publication system based on the rankings of the images. More specifically, as indicated at 151, images with higher scores can be placed higher up on a search results page. For example, if a potential buyer is looking to purchase a particular item, and the buyer's search returns several of those items on the auction site, the auction operator can place the higher scored images at the top of the search results page(s), thereby increasing the likelihood that the buyer will actually purchase one of the displayed items. Second, as indicated at 152, the operator of the network-based publication system can use the information gleaned from the data collection to advise sellers of goods on the site the features of a particular type or category of goods that increase the likelihood that the good will sell and/or sell at a higher price.

Platform Architecture

Figure 2:
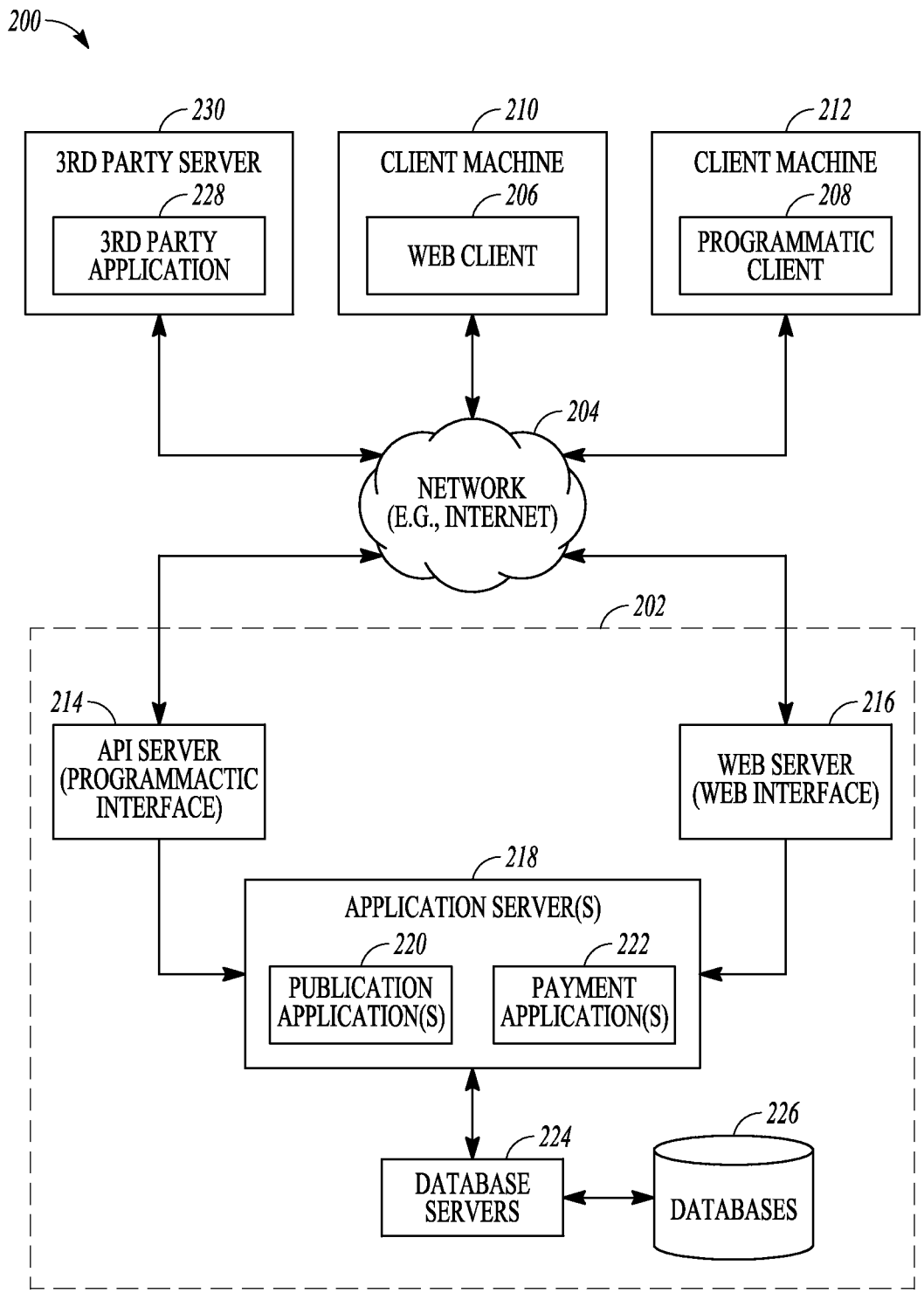
FIG. 2 is a block diagram illustrating an example architecture for a network-based publication system within which methods and systems for evaluating, ranking, and/or scoring images for display on the network based publication system can be implemented.

FIG. 2 is a block diagram illustrating an example architecture for a network-based publication system within which methods and systems for scoring images that are to be displayed on a network-based publication system can be implemented. The block diagram depicts a client-server system 200, within which an example embodiment can be deployed. A networked system 202, in the example forms of a network-based marketplace, on-line retail site, or publication system, provides server side functionality, via a network 204 (e.g., the Internet or Wide Area Network (WAN)) to one or more clients 210, 212. FIG. 2 illustrates, for example, a web client 206 (e.g., a browser, such as the INTERNET EXPLORER browser developed by Microsoft Corporation of Redmond, Wash.), and a programmatic client 208 executing on respective client machines 210 and 217.

An Application Program Interface (API) server 214 and a web server 216 are coupled to, and provide programmatic and web interfaces respectively to, one or more application servers 218. The application servers 218 host one or more publication applications 220 and payment applications. The application servers 218 are, in turn, shown to be coupled to one or more databases servers 224 that facilitate access to one or more databases 226. In some examples, the application server 218 can access the databases 226 directly without the need for a database server 224.

The publication applications 220 may provide a number of publication functions and services to users that access the networked system 202. The payment applications 222 may likewise provide a number of payment services and functions to users. The payment applications 222 may allow users to accumulate value (e.g., in a commercial currency, such as the U.S. dollar, or a proprietary currency, such as "points") in accounts, and then later to redeem the accumulated value for products (e.g., goods or services) that are made available via the publication system applications 220. While the publication and payment applications 220 and 222 are shown in FIG. 2 to all form part of the networked system 202, it will be appreciated that, in alternative embodiments, the payment applications 222 may form part of a payment service that is separate and distinct from the networked system 202.

Further, while the system 200 shown in FIG. 2 employs a client-server architecture, the present invention is of course not limited to such an architecture, and could equally well find application in a distributed, or peer-to-peer, architecture system, for example. The various publication and payment applications 220 and 222 could also be implemented as standalone software programs, which do not necessarily have networking capabilities.

The web client 206 accesses the various publication and payment applications 220 and 222 via, the web interface supported by the web server 216. Similarly, the programmatic client 208 accesses the various services and functions provided by the publication and payment applications 220 and 222 via the programmatic interface provided by the API server 214. The programmatic client 208 may, for example, be a seller application (e.g., the TURBOLISTER application developed by eBay Inc., of San Jose, Calif.) to enable sellers to author and manage listings on the networked system 202 in an off-line manner, and to perform batch-mode communications between the programmatic client 208 and the networked system 202.

FIG. 2 also illustrates a third party application 228, executing on a third party server machine 230, as having programmatic access to the networked system 202 via the programmatic interface provided by the API server 214. For example, the third party application 228 may, utilizing information retrieved from the networked system 202, support one or more features or functions on a website hosted by the third party. The third party website may, for example, provide one or more promotional, publication or payment functions that are supported by the relevant applications of the networked system 202.

Publication Applications

FIG. 3 is a block diagram illustrating multiple applications 220 that, in an example embodiment, are provided as part of the networked system 202. The applications 220 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 226 via the database servers 228.

The networked system 202 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication applications 220 may include at least one publication application 300 and one or more auction applications 302 which support auction-format listing and price setting mechanisms (e.g., English, Dutch, Vickrey, Chinese, Double, Reverse auctions etc.). The various auction applications 302 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 304 support fixed-price listing formats (e.g., the traditional classified advertisement-type listing or a catalogue listing) and buyout-type listings. Specifically, buyout-type listings including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 306 allow a seller to group listings within a "virtual" store, which may be branded and otherwise personalized by and for the seller or merchant. Such a virtual store may also offer promotions, incentives and features that are specific and personalized to a relevant seller. Coupon applications are configurable to provide coupon related services through the store applications 306 to individual sellers. In this example, individual sellers can access many coupon related functions. For instance, through the coupon applications a seller can create a coupon campaign specific to the seller's personalized "virtual" store.

Reputation applications 308 allow users that transact, utilizing the networked system 202, to establish, build and maintain reputations, which may be made available and published to potential trading partners. Consider that where, for example, the networked system 202 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 202 over time. Other potential trading partners may then reference such a reputation for the purposes of assessing credibility and trustworthiness.

Personalization applications 310 allow users of the networked system 202 to personalize various aspects of their interactions with the networked system 202. For example a user may, utilizing an appropriate personalization application 310, create a personalized reference page at which information regarding transactions to which the user is (or has been) a party may be viewed. A personalization application 310 may enable a user to personalize listings and other aspects of their interactions with the networked system 202 and other parties. Additionally, a personalization application can enable a user to view and organize coupons issued by the publication system or individual merchants within the publication system.

The networked system 202 may support a number of publication systems that are customized, for example, for specific geographic regions. A version of the networked system 202 may be customized for the United Kingdom, whereas another version of the networked system 202 may be customized for the United States. Each of these versions may operate as an independent publication system, or may be customized (or internationalized) presentations of a common underlying publication system. The networked system 202 may accordingly include a number of internationalization applications 312 that customize information (and/or the presentation of information) by the networked system 202 according to predetermined criteria (e.g., geographic, demographic or publication system criteria). For example, the internationalization applications 312 may be used to support the customization of information for a number of regional websites that are operated by the networked system 202 and that are accessible via respective web servers 216.

Navigation of the networked system 202 may be facilitated by one or more navigation applications 314. For example, a search application (as an example of a navigation application) may enable key word searches of listings published via, the networked system 202. A browse application may allow users to browse various category, catalogue, or inventory data structures according to which listings may be classified within the networked system 202. Various other navigation applications may be provided to supplement the search and browsing applications. Certain navigation applications may be configured to surface coupons relevant to the search or browsing pages delivered in response to a user's query.

In order to make listings, available via the networked system 202, as visually informing and attractive as possible, the publication system applications 220 may include one or more imaging applications 316 utilizing which users may upload images for inclusion within listings. An imaging application 316 also operates to incorporate images within viewed listings. The imaging applications 316 may also support one or more promotional features, such as image galleries that are presented to potential buyers. For example, sellers may pay an additional fee to have an image included within a gallery of images for promoted items.

Listing creation applications 318 allow sellers conveniently to author listings pertaining to goods or services that they wish to transact via the networked system 202, and listing management applications 320 allow sellers to manage such listings. Specifically, where a particular seller has authored and/or published a large number of listings, the management of such listings may present a challenge. The listing management applications 320 provide a number of features (e.g., auto-relisting, inventory level monitors, etc) to assist the seller in managing such listings. One or more post-listing management applications 322 also assist sellers with a number of activities that typically occur post-listing. For example, upon completion of an auction facilitated by one or more auction applications 302, a seller may wish to leave feedback regarding a particular buyer. To this end, a post-listing management application 322 may provide an interface to one or more reputation applications 308, so as to allow the seller conveniently to provide feedback regarding multiple buyers to the reputation applications 308.

Dispute resolution applications 324 provide mechanisms whereby disputes arising between transacting parties may be resolved. For example, the dispute resolution applications 324 may provide guided procedures whereby the parties are guided through a number of steps in an attempt to settle a dispute, in the event that the dispute cannot be settled via the guided procedures, the dispute may be escalated to a third party mediator or arbitrator.

A number of fraud prevention applications 326 implement fraud detection and prevention mechanisms to reduce the occurrence of fraud within the networked system 202.

Messaging applications 328 are responsible for the generation and delivery of messages to users of the networked system 202, such messages for example advising users regarding the status of listings at the networked system 202 (e.g., providing "outbid" notices to bidders during an auction process or to provide promotional and merchandising information to users). Respective messaging applications 328 may utilize any one of a number of message delivery networks and platforms to deliver messages to users. For example, messaging applications 328 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks. The messaging applications 328 may also be configured to communicate over certain social networking platforms, such as Twitter or Facebook. Communication with a social networking platform may require installation of an application or plug-in within a user's social network account.

Merchandising applications 330 support various merchandising functions that are made available to sellers to enable sellers to increase sales via the networked system 202. The merchandising applications 330 also operate the various merchandising features that may be invoked by sellers, and may monitor and track the success of merchandising strategies employed by sellers. The merchandising applications 330 may also provide an additional mechanism for sellers to create and manage coupon campaigns within the networked system 202.

The networked system 202 itself, or one or more parties that transact via the networked system 202, may operate loyalty programs that are supported by one or more loyalty/promotions applications 332. For example, a buyer may earn loyalty or promotions points for each transaction established and/or concluded with a particular seller, and be offered a reward for which accumulated loyalty points can be redeemed. The loyalty promotion applications 332 may work in conjunction with the coupon applications to reward loyal users with valuable coupons for use within the networked system 202.

Real-time activity applications 334 support various functions within the networked system 202 by providing real-time information about user activities within the networked system 202. For example, the real-time activity applications 334 can provide information to the messaging applications 328 or personalization applications 310 to enhance a user's experience or improve a seller's ability to move merchandise. In certain examples, the real-time activity applications 334 provide real-time activity data to the coupon applications 332 enabling real-time, instantaneous delivery of user targeted coupons. Real-time activity data, delivered by the real-time activity applications 334, may also be used to coordinate delivery of coupons within the networked system 202 and through external communications channels supported by the messaging applications 328.

Data Structures

Figure 4:
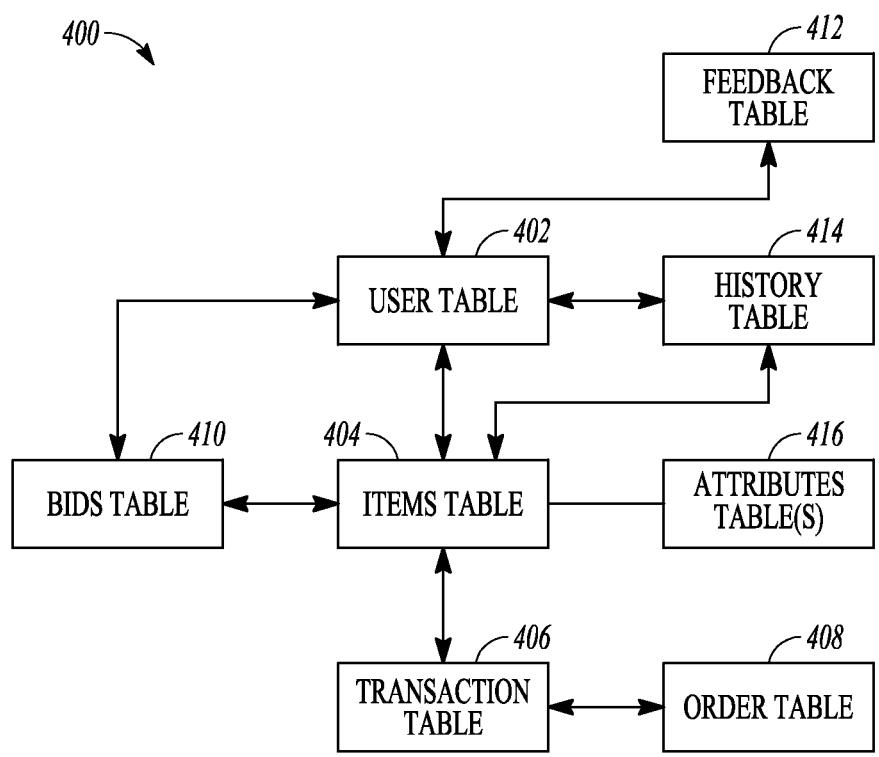
FIG. 4 is a high-level entity-relationship diagram, illustrating various tables that may be maintained within the databases, and that are utilized by and support applications.

FIG. 4 is a high-level entity-relationship diagram, illustrating various tables 400 that may be maintained within the databases 226, and that are utilized by and support the applications 220 and 222. A user table 402 contains a record for each registered user of the networked system 202, and may include identifier, address and financial instrument information pertaining to each such registered user. A user may operate as a seller, a buyer, or both, within the networked system 202. In one example embodiment, a buyer may be a user that has accumulated value (e.g., commercial or proprietary currency), and is accordingly able to exchange the accumulated value for items that are offered for sale by the networked system 202.

The tables 400 can also include an items table 404 in which are maintained item records for goods and services that are available to be, or have been, transacted via, the networked system 202. Each item record within the items table 404 may furthermore be linked to one or more user records within the user table 402, so as to associate a seller and one or more actual or potential buyers with each item record.

A transaction table 406 contains a record for each transaction (e.g., a purchase or sale transaction) pertaining to items for which records exist within the items table 404.

An order table 408 is populated with order records, each order record being associated with an order. Each order, in turn, may be with respect to one or more transactions for which records exist within the transaction table 406.

Bid records within a bids table 410 each relate to a bid received at the networked system 202 in connection with an auction-format listing supported by an auction application 302. A feedback table 412 is utilized by one or more reputation applications 308, in one example embodiment, to construct and maintain reputation information concerning users. A history table 414 maintains a history of transactions to which a user has been a party. One or more attributes tables 416 record attribute information pertaining to items for which records exist within the items table 404. Considering only a single example of such an attribute, the attributes tables 416 may indicate a currency attribute associated with a particular item, the currency attribute identifying the currency of a price for the relevant item as specified in by a seller.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
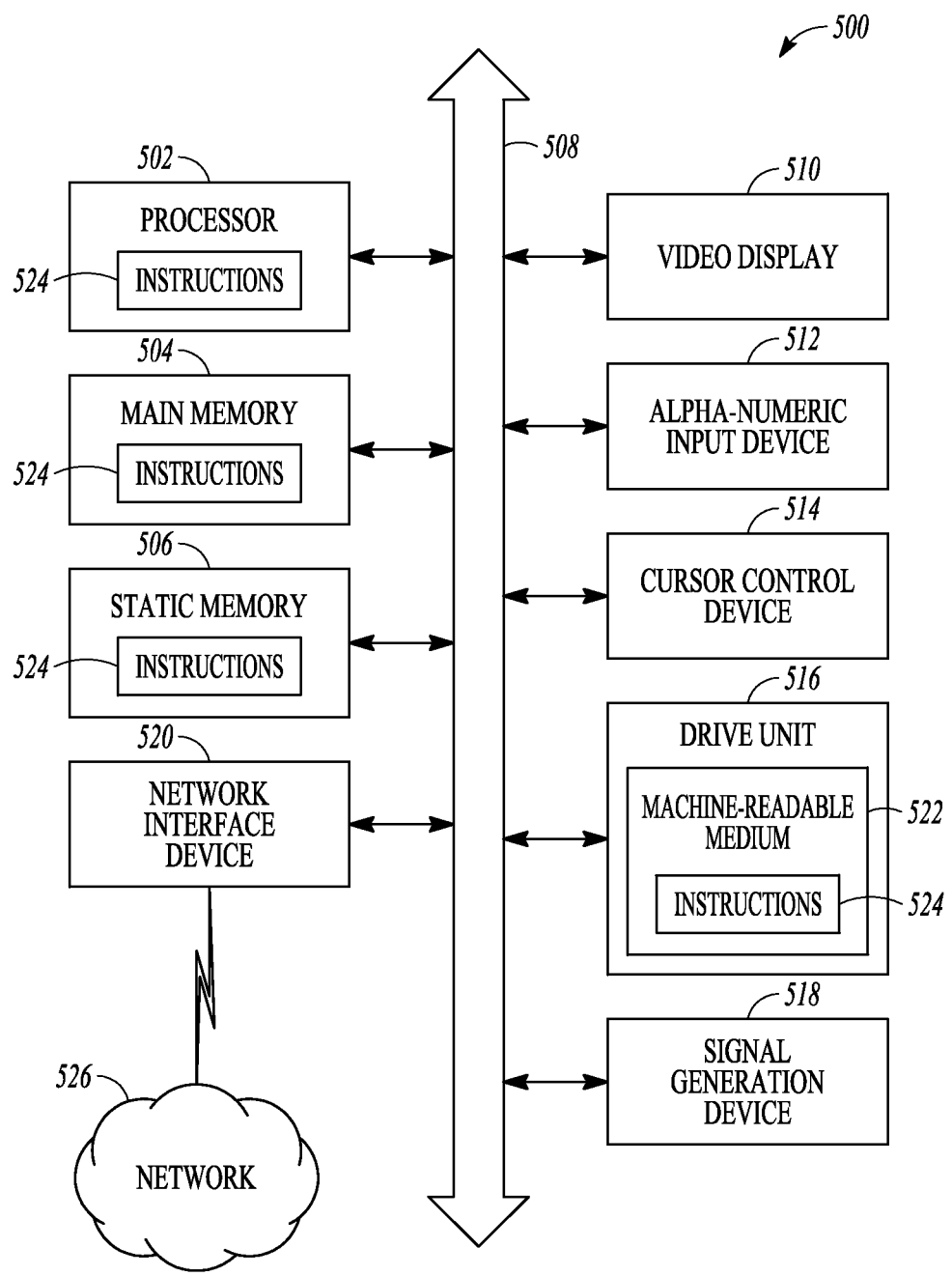
FIG. 5 is a block diagram of machine in the example form of a computer system within which instructions, for causing the machine to perform any one or more of the methodologies discussed herein, may be executed.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP).

Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system to score images for display on a network-based publication system have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A system comprising:
   one or more processors;
   a memory storing instructions that, when executed by the one or more processors, cause the one or more processors to perform operations comprising:
   accessing images of objects;
   segmenting foregrounds of the images to identify the objects depicted in the segmented foregrounds of the images;
   determining a respective multidimensional feature vector for the each of the respective images, wherein determining each multidimensional feature vector includes determining a vector for each of a plurality of features comprising a respective size, a respective brightness, and a respective contrast for each of the respective objects within the respective images based on the segmented foregrounds of the images;
   receiving data that indicates at least some of the objects depicted in the segmented foregrounds of the images were purchased by users during display of the images on a network-based publication system;
   for each of the images, calculating a ratio of purchases of the object depicted in the image to presentations of the image by the network-based publication system;
   for each of the images, correlating, by a machine learning phase each feature vector of the multidimensional feature vector for the image to the calculated ratio of purchase to presentation for the corresponding image, and selecting a feature vector of the multidimensional feature vector that is most closely related to the calculated ratio of purchases to presentations for the image;
   ranking the images based on a combination of the calculated ratios of purchases to presentations and the selected feature vector; and
   redisplaying the images on the network-based publication system to at least one user based on the ranking of the images.

2. The system of claim 1, wherein the ranking of the images comprises generating a model for the images.

3. The system of claim 2, wherein the ranking of the images is a first ranking of images and is further based on a factor selected from a group consisting of a previous second ranking of the images, a price at which at least one of the objects was sold, a price-sales function, a sales-time on site function, and a human scored quality and price function.

4. The system of claim 3, wherein the ranking of the images is further based on data that indicates a user action selected from a group consisting of selecting an object by clicking on the object, placing the object in an electronic shopping cart, and viewing the object for a measured amount of time.

5. The system of claim 1, wherein the network-based publication system comprises an electronic auction system.

6. The system of claim 1, wherein the objects comprise items offered for sale on the network-based publication system.

7. The system of claim 1, wherein the ranking of the image is further based on a feature selected from a group consisting of a contrast between the object and a background of the image, a clarity of the image, and a color spectrum of the image.

8. The system of claim 1, wherein the redisplaying of the images on the network-based publication system comprises displaying, on a search results page, images with a higher ranking above images with a lower ranking.

9. A method comprising:
by operation of one or more processors of a machine:
accessing images of objects;
segmenting foregrounds of the images to identify the objects depicted in the segmented foregrounds of the images;
determining a respective multidimensional feature vector for the each of the respective images, wherein determining each multidimensional feature vector includes determining a vector for each of a plurality of features comprising a respective size, a respective brightness, and a respective contrast for each of the respective objects within the respective images based on the segmented foregrounds of the images;
receiving data that indicates at least some of the object depicted in the segmented foregrounds of the images were purchased by users during display of the images on a network-based publication system;
for each of the images, calculating a ratio of purchases of the object depicted in the image to presentations of the image by the network-based publication system;
for each of the images, correlating, by a machine learning phase each feature vector of the multidimensional feature vector for the image to the calculated ratio of purchase to presentation for the corresponding image, and selecting a feature vector of the multidimensional feature vector that is most closely related to the calculated ratio of purchases to presentations for the image;
ranking the images based on a combination of the calculated ratios of purchases to presentations and the selected feature vector; and
redisplaying the images on the network-based publication system to at least one user based on the ranking of the images.

10. The method of claim 9,
wherein the ranking of the images comprises generating a model for the images;
wherein the ranking of the images is a first ranking of images and is further based on a factor selected from a group consisting of a previous second ranking of the images, a price at which the object sold, a price-sales function, a sales-time on site function, and a human scored quality and price function; and
wherein the ranking of the image is further based on data that indicates a user action selected from a group consisting of selecting an object by clicking on the object, placing the object in an electronic shopping cart, and viewing the object for a measured amount of time.

11. The method of claim 9, wherein the ranking of the images is further based on a feature selected from a group consisting of a contrast between the object and a background of the image, a clarity of the image, and a color spectrum of the image.

12. The method of claim 9, wherein the redisplaying of the images on the network-based publication system comprises displaying, on a search results page, images with a higher ranking above images with a lower ranking.

13. A non-transitory computer readable storage device comprising instructions that, when executed by one or more processors of a machine, cause the machine to perform operations comprising:
accessing images of objects;
determining a respective multidimensional feature vector for the each of the respective images, wherein determining each multidimensional feature vector includes determining a vector for each of a plurality of features comprising a respective size, a respective brightness, and a respective contrast for each of the respective objects within the respective images based on the segmented foregrounds of the images;
receiving data that indicates at least some of the object depicted in the segmented foregrounds of the images were purchased by users during display of the images on a network-based publication system;
for each of the images, calculating a ratio of purchases of the object depicted in the image to presentations of the image by the network-based publication system;
for each of the images, correlating, by a machine learning phase each feature vector of the multidimensional feature vector for the image to the calculated ratio of purchase to presentation for the corresponding image, and selecting a feature vector of the multidimensional feature vector that is most closely related to the calculated ratio of purchases to presentations for the image;
ranking the images based on a combination of the calculated ratios of purchases to presentations and the selected feature vector; and
redisplaying the images on the network-based publication system to at least one user based on the ranking of the images.

14. The non-transitory computer readable storage device of claim 13,
wherein the ranking of the images comprises generating a model for the images;
wherein the ranking of the images is a first ranking of images and is further based on a factor selected from a group consisting of a previous second ranking of the images, a price at which the object sold, a price-sales function, a sales-time on site function, and a human scored quality and price function; and
wherein the ranking of the image is further based on data that indicates a user action selected from a group consisting of selecting an object by clicking on the object, placing the object in an electronic shopping cart, and viewing the object for a measured amount of time.

15. The non-transitory computer readable storage device of claim 13, wherein the redisplaying of the images on the network-based publication system comprises displaying, on a search results page, images with a higher ranking above images with a lower ranking.

\* \* \* \* \*